United States Patent [19]

Hamada et al.

[11] Patent Number: 5,244,056
[45] Date of Patent: Sep. 14, 1993

[54] POWER TRANSMITTING SYSTEM OF FOUR-WHEEL DRIVE VEHICLE

[75] Inventors: Tetsurou Hamada; Kentaro Arai; Katsuhiro Kitamura; Takayuki Yakou, all of Saitama, Japan

[73] Assignee: Honda Giken Kogyo Kabushiki Kaisha, Tokyo, Japan

[21] Appl. No.: 907,157

[22] Filed: Jul. 1, 1992

[30] Foreign Application Priority Data

Jul. 4, 1991 [JP] Japan ................................ 3-164704

[51] Int. Cl.⁵ .......................................... B60K 17/356
[52] U.S. Cl. .................................. 180/247; 180/242; 180/233
[58] Field of Search ............... 180/249, 242, 305, 307, 180/248, 247, 233

[56] References Cited

U.S. PATENT DOCUMENTS 3,994,353 11/1976 Greene ........................... 180/242 X
4,077,484 3/1978 Dezelan ......................... 180/242 X
5,117,936 6/1992 Nakamura et al. ................ 180/242
5,137,100 8/1992 Scott et al. ..................... 180/305 X

FOREIGN PATENT DOCUMENTS 2-238244 11/1990 Japan .
1206133 1/1986 U.S.S.R. ............................ 180/242
2245237 1/1992 United Kingdom .

Primary Examiner—Robert J. Oberleitner
Assistant Examiner—Carla Mattix
Attorney, Agent, or Firm—Lyon & Lyon

[57] ABSTRACT

A power transmitting system of a four-wheel drive vehicle having primary driven wheels driven directly by a prime mover, and subsidiary driven wheels driven through a hydraulic clutch. The power transmitting system comprises a first hydraulic pump driven in operative association with the primary driven wheels and a second hydraulic pump driven in operative association with the subsidiary driven wheels. Each hydraulic pump has a pair of ports which serve as an intake and a discharge with the functions of such ports being reversed between forward and backward movement of the vehicle. A first oil passage connects the intake port of one pump with the discharge of the other pump and a second oil passage connects the discharge of the one pump with the intake of the other pump. Third and fourth oil passages connect the first and second oil passages, respectively, with a working hydraulic pressure chamber in the hydraulic clutch. A one-way valve is provided in each of the third and fourth oil passages for permitting only a flow of oil toward the working hydraulic pressure chamber. The reversal of vehicle movement and direction of oil discharged from each of the hydraulic pumps provided in the power transmitting system of the four-wheel drive vehicle is compensated for by a simple structure of oil passages and one-way valves.

17 Claims, 2 Drawing Sheets

POWER TRANSMITTING SYSTEM OF FOUR-WHEEL DRIVE VEHICLE

BACKGROUND OF THE INVENTION

1. Field of the Invention

This invention relates to a power transmitting system of a four-wheel drive vehicle, in which front and rear wheels can be driven by a common engine.

2. Description of the Prior Art

Such power transmitting systems of four-wheel drive vehicles are known, and one example thereof is that a front wheel axle is directly connected to an engine, a rear wheel axle is connected through a hydraulic clutch to the front wheel axle, and the drive connection of front wheels to rear wheels can be achieved by applying, to the hydraulic clutch, a hydraulic pressure produced by a hydraulic pump in response to the relative rotation of both the axles.

A gear pump or vane pump generally used as a hydraulic pump for such a power transmitting system is accompanied by a problem that the direction of oil discharged from the pump is determined by the direction of rotation of the pump and hence, the direction of oil discharged is reversed between during forward and backward movements of the vehicle. It is a conventional practice to compensate for the reversal of the direction of oil discharged from the hydraulic pump between forward and backward movements of the vehicle by manual or automatic switchover of a selector or switchover valve provided in an oil passage which connects the hydraulic pump with a working hydraulic pressure chamber in the hydraulic clutch (for example, see Japanese Patent Application No. 238244/90).

With a construction in which the switchover valve is manually switched over between the forward and backward movements of the vehicle in the above manner, however, it is necessary to provide a mechanism for operating the switchover valve. In addition, with a construction in which the switchover valve is automatically switched over, the structure of the switchover valve becomes complicated, bringing about the possibility that trouble such as a locking of a spool may be generated.

SUMMARY OF THE INVENTION

Accordingly, it is an object of the present invention to automatically compensate for the reversal of the direction of oil discharged from the hydraulic pump in a power transmitting system of a four-wheel drive vehicle by a simple structure with less possibility of trouble.

To achieve the above object, according to a first feature of the present invention, there is provided a power transmitting system of a four-wheel drive vehicle having primary driven wheels driven directly by a prime mover and subsidiary driven wheels driven through a hydraulic clutch, comprising a first hydraulic pump driven in operative association with the primary driven wheels and having a first port which functions as a discharge port during forward movement of the vehicle and as an intake port during backward movement of the vehicle, and a second port which functions as an intake port during forward movement of the vehicle and as a discharge port during backward movement of the vehicle; a second hydraulic pump driven in operative association with the subsidiary driven wheels and having a third port which functions as an intake port during forward movement of the vehicle and as a discharge port during backward movement of the vehicle, and a fourth port which functions as a discharge port during forward movement of the vehicle and as an intake port during backward movement of the vehicle; a first connecting oil passage connecting the first port with the third port; a second connecting oil passage connecting the second port with the fourth port; a third connecting oil passage connecting the first connecting oil passage with a working hydraulic pressure chamber in the hydraulic clutch; a fourth connecting oil passage connecting the second connecting oil passage with the working hydraulic pressure chamber in the hydraulic clutch; a first one-way valve provided in the third connecting oil passage for permitting only a flow of oil from the first connecting oil passage toward the working hydraulic pressure chamber; and a second one-way valve provided in the fourth connecting oil passage for permitting only a flow of oil from the second connecting oil passage toward the working hydraulic pressure chamber.

With the first feature of the present invention, it is possible to automatically compensate for the reversal of the direction of oil discharged from the hydraulic pump between the forward and backward movements of the vehicle. Moreover, such compensation is achieved by using only two one-way valves and therefore, the structure thereof can be simplified to substantially reduce the possibility of trouble.

In addition, according to a second feature of the present invention, there is provided a power transmitting system of a four-wheel drive vehicle having front wheels driven directly by a prime mover, and rear wheels driven through a hydraulic clutch, comprising a first hydraulic pump driven in operative association with the front wheels and having a first port which functions as a discharge port during forward movement of the vehicle and as an intake port during backward movement of the vehicle, and a second port which functions as an intake port during forward movement of the vehicle and as a discharge port during backward movement of the vehicle; a second hydraulic pump driven in operative association with the rear wheels and having a third port which functions as an intake port during forward movement of the vehicle and as a discharge port during backward movement of the vehicle, and a fourth port which functions as a discharge port during forward movement of the vehicle and as an intake port during backward movement of the vehicle; a first connecting oil passage connecting the first port with the third port; a second connecting oil passage connecting the second port with the fourth port; a third connecting oil passage connecting the first connecting oil passage with a working hydraulic pressure chamber in the hydraulic clutch; a fourth connecting oil passage connecting the second connecting oil passage with the working hydraulic pressure chamber in the hydraulic clutch; a first one-way valve provided in the third connecting oil passage for permitting only a flow of oil from the first connecting oil passage toward the working hydraulic pressure chamber; a second one-way valve provided in the fourth connecting oil passage for permitting only a flow of oil from the second connecting oil passage toward the working hydraulic pressure chamber; a fifth connecting oil passage diverged from the first connecting oil passage and connected to the second connecting oil passage; a third one-way valve provided in the fifth connecting oil passage for permitting only a flow of oil from the second connecting oil passage side toward the first connecting oil passage; and means for cutting off the communication between the second connecting oil passage and the fifth connecting oil passage during backward movement of the vehicle.

With the second feature of the present invention, when the front wheels become locked or about to become locked due to a quick braking or the like during forward movement of the vehicle, even if the amount of oil discharged from the fourth port in the second hydraulic pump exceeds the amount of oil drawn into the first hydraulic pump through the second port, the excess oil developed in the second connecting oil passage is passed from the second connecting oil passage through the fifth connecting oil passage back to the third port in the second hydraulic pump and therefore, the engagement of the hydraulic clutch is avoided. As a result, a braking force for the front wheels cannot be transmitted to the rear wheels, and the distribution of the braking force to the front and rear wheels can be maintained at an appropriate value. When hydraulic pressure is developed in the first connecting oil passage, for example, upon slipping of the front wheel during forward movement, such hydraulic pressure is blocked by the third one way valve and cannot escape through the fifth connecting oil passage into the second connecting oil passage, ensuring that the hydraulic clutch can be brought into an engaged state to deliver torque to the rear wheels. Further, when hydraulic pressure is developed in the second connecting oil passage, for example, upon slipping of the front wheel during backward movement, such hydraulic pressure cannot escape through the fifth connecting oil passage into the first connecting oil passage, ensuring that the hydraulic clutch can be brought into an engaged state to deliver torque to the rear wheels.

The above and other objects, features and advantages of the invention will become apparent from a consideration of the following description of the preferred embodiments, taken in conjunction with the accompanying drawings.

BRIEF DESCRIPTION OF THE DRAWINGS

Drawings illustrate a preferred embodiment of the present invention, wherein.

DESCRIPTION OF THE PREFERRED EMBODIMENTS

Figure 1:
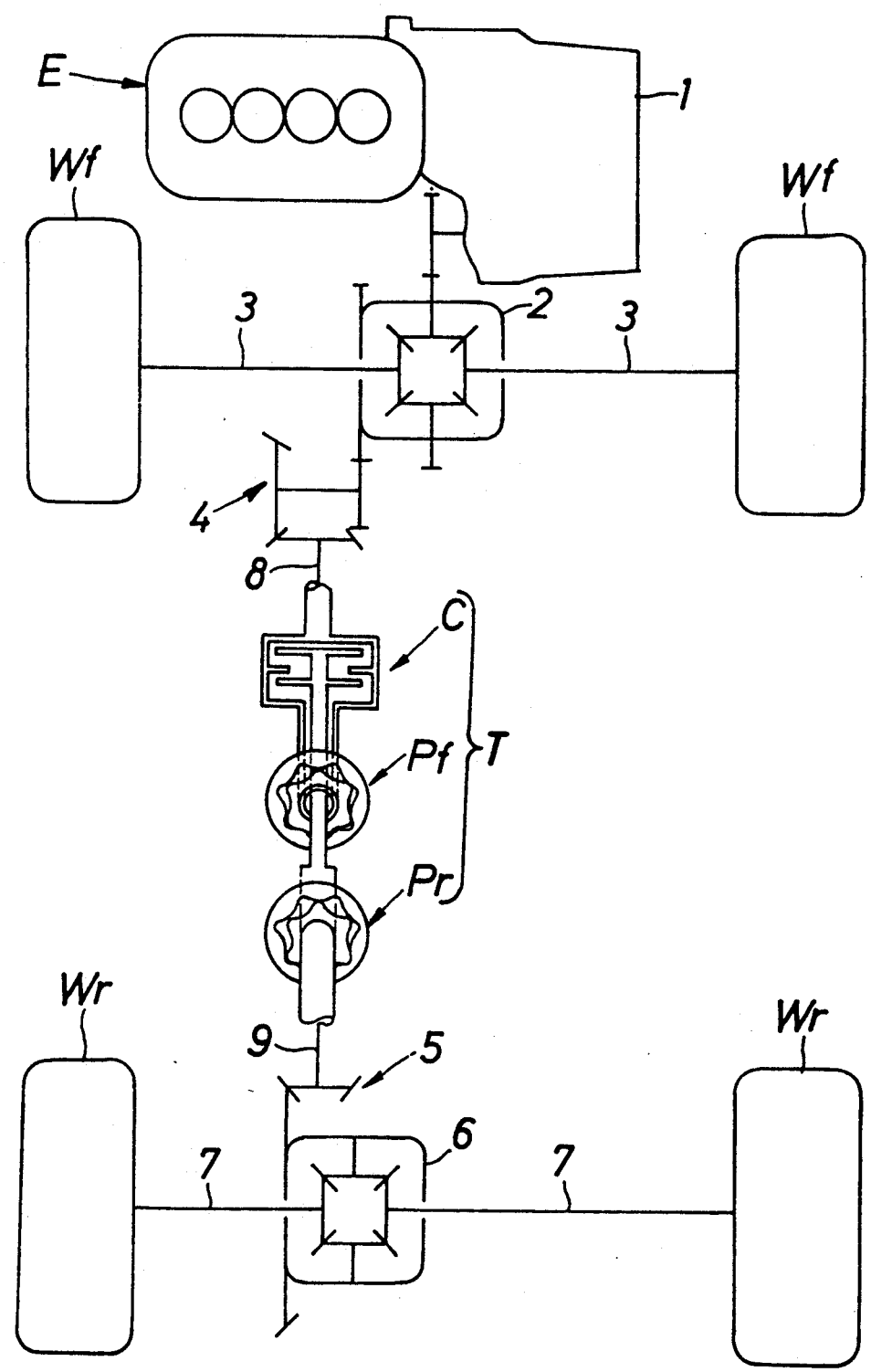
FIG. 1 is a schematic diagram of a power transmitting system of a four-wheel drive vehicle.

Referring to FIG. 1, an output from an engine E as a prime mover mounted at a front portion of a four-wheel drive vehicle is supplied through a transmission 1 to a differential 2 mounted between the front wheels. The output from the differential 2 is transmitted through drive shafts 3, 3 to left and right front wheels Wf and Wf as primary driven wheels. The output of the engine E inputted to the differential 2 is also supplied through a bevel gear mechanism 4 to a power transmitting system T which will be described hereinafter. The output from the power transmitting system T is transmitted through a bevel gear mechanism 5 to a differential 6 mounted between the rear wheels. Further, the output from the differential 6 is transmitted through drive shafts 7, 7 to left and right rear wheels Wr and Wr as subsidiary driven wheels.

The power transmitting system T is comprised of a first hydraulic pump Pf driven by an input shaft 8 which extends from the bevel gear mechanism 4 at the side of the front wheels, a second hydraulic pump Pr driven by an output shaft 9 which is connected to the bevel gear mechanism 5 at the side of the rear wheels, a wet multiplate type hydraulic clutch C which serves to transmit and intercept a driving force between the input and output shafts 8 and 9, and a hydraulic circuit Hc (which will be described hereinafter) for controlling the hydraulic clutch C.

The arrangement of the hydraulic circuit Hc will now be described with reference to FIG. 2. The first hydraulic pump Pf comprises a trochoidal pump and includes a first port 10 which functions as a discharge port during forward movement of the vehicle and as an intake port during backward movement of the vehicle, and a second port 11 which functions as an intake port during forward movement of the vehicle and as a discharge port during backward movement of the vehicle. The second pump Pr likewise comprises a trochoidal pump and includes a third port 12 which functions as an intake port during forward movement of the vehicle and as a discharge port during backward movement of the vehicle, and a fourth port 13 which functions as a discharge port during forward movement of the vehicle and as an intake port during backward movement of the vehicle. The amount of oil discharged per rotation of each of the hydraulic pumps Pf and Pr are set such that the amount of oil discharged from the second hydraulic pump Pr is slightly (e.g., 2.5%) larger than that discharged from the first hydraulic pump Pf. The first port 10 and the third port 12 are interconnected through a first connecting oil passage 14, while the second port 11 and the fourth port 13 are interconnected through a second oil passage 15. It should be noted that the directions of oil discharged from the hydraulic pumps Pf and Pr comprising the trochoidal pumps depend upon the directions of rotation thereof and hence, such directions of oil discharged are reversed between forward movement and backward movement of the vehicle. White and black arrows shown in FIG. 2 in the hydraulic pumps Pf and Pr indicate the directions of oil discharged during forward and backward movements of the vehicle, respectively.

A working hydraulic pressure chamber 16 containing therein a piston of the hydraulic clutch C for engagement of the latter is connected with the first connecting oil passage 14 and the second connecting oil passage 15 through a third connecting oil passage 17 and a fourth connecting oil passage 18, respectively. A first one-way valve 19 is provided in the third connecting oil passage 17 for permitting only a flow of oil from the first connecting oil passage 14 into the working hydraulic pressure chamber 16. A second one-way valve 20 is provided in the fourth connecting oil passage 18 for permitting only a flow of oil from the second connecting oil passage 15 into the working hydraulic pressure chamber 16. In addition, a third one-way valve 22 is provided between an oil tank 21 and the first connecting oil passage 14 for permitting only a flow of oil from the oil tank 21 into the first connecting oil passage 14, and a fourth one-way valve 23 is provided between the oil tank 21 and the second connecting oil passage 15 for permitting only a flow of oil from the oil tank 21 into the second connecting oil passage 15.

A choke type restriction 24 is provided upstream of the working hydraulic pressure chamber 16 in the hydraulic clutch C. The restriction flowpath of the restriction 24 is longer than the restriction diameter thereof. In addition, provided downstream of the working hydraulic pressure chamber 16 are an orifice type restriction 25 whose restriction flowpath is shorter than the restriction diameter thereof, and a first relief valve 26 serving as means for occluding the orifice type restriction 25. The oil passed through the orifice type restriction 25 and the first relief valve 26 is further passed through a cooling portion 27 of the hydraulic clutch back to the oil tank 21. A second relief valve 28 is interposed between a location upstream of the choke type restriction 24 and a location downstream of the orifice type restriction 25 for restraining an upper limit value of the hydraulic pressure transmitted to the working hydraulic pressure chamber 16.

Figure 2:
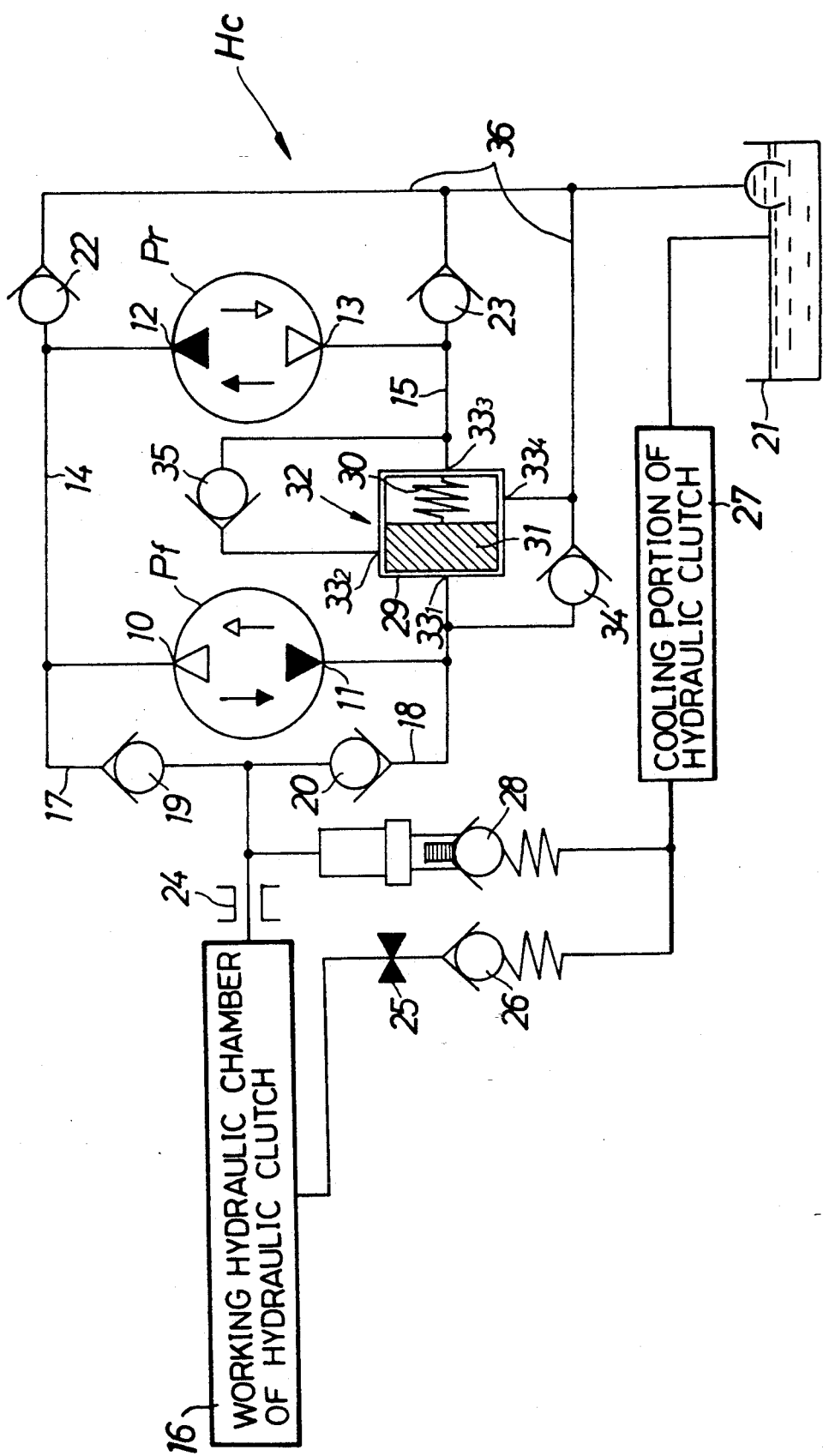
FIG. 2 is a diagram of a hydraulic circuit in the power transmitting system.

A spool valve 32 is provided in the second connecting oil passage 15 and comprises a spool 31 contained within a housing 29 and biased by a spring 30 in a leftward direction as viewed FIG. 2. When the spool 31 is in a left position as shown in FIG. 2, the communication between the ports $33_1$ and $33_2$ is cut off by the spool 31, and at the same time, ports $33_3$ and $33_4$ are in communication with each other. When the spool 31 is moved into a right position against a force of the spring 30, the communication between the ports $33_3$ and $33_4$ is cut off by the spool 31, and at the same time, the ports $33_1$ and $33_2$ are put into communication with each other. A fifth one-way valve 34 is provided between the ports $33_1$ and $33_4$ for permitting only a flow of oil from the port $33_4$ into the port $33_1$, and a sixth one-way valve 35 is provided between the ports $33_2$ and $33_3$ for permitting only a flow of oil from the port $33_2$ into the port $33_3$. Thus, during forward movement of the vehicle, i.e., when the oil is being discharged from the fourth port 13 in the second hydraulic pump Pr, the spool 31 is in the shown left position, so that the second connecting oil passage 15 and the first connecting oil passage 14 are interconnected through the fifth connecting oil passage 36. On the other hand, during backward movement of the vehicle, i.e., when the oil is being discharged from the second port 11 in the first hydraulic pump Pf, the spool 31 is moved rightwardly against the force of the spring 30 and the communication between the second connecting oil passage 15 and the fifth connecting oil passage 36 is cut off by the fourth one-way valve 23 and the fifth one-way valve 34.

The operation of the above-described preferred embodiment the present invention will be described below.

At the start of the vehicle, the driving force from the engine E is transmitted via the transmission 1, the differential 2 and the drive shafts 3, 3 to the front wheels Wf, Wf, and also from the differential 2 via the bevel gear mechanism 4 and the input shaft 8 to the first hydraulic pump Pf to drive the latter. During this time, the hydraulic clutch is in a disengaged state, and the second hydraulic pump Pr connected to the output shaft 9 is in its stopped state. Thus, the oil drawn from the oil tank 21 through the fifth one-way valve 34, or from the oil tank 21 through the fourth one-way valve 23, the ports $33_3$ and $33_4$ in the spool valve 32 and the fifth one-way valve 34 into the second port 11 in the first hydraulic pump Pf is discharged through the first port 10 into the first connecting oil passage 14. At this time, the third one-way valve 22 in the fifth connecting oil passage 36 is closed and hence, all the oil discharged into the first connecting oil passage 14 flows into the third connecting oil passage 17, where the oil is passed through the first one-way valve 19 and is blocked by the second one-way valve 20 and supplied via the choke type restriction 24 into the working hydraulic pressure chamber 16 in the hydraulic clutch C.

When the hydraulic clutch C is brought into its engaged state in the above manner, the rear wheels Wr, Wr are driven through the output shaft 9, the bevel gear mechanism 5, the differential 6 and the drive shafts 7, 7, and the second hydraulic pump Pr connected to the output shaft 9 is rotated. As a result, the oil discharged from the first hydraulic pump Pf is drawn through the first connecting oil passage 14 into the second hydraulic pump Pr in response to an increase in rotational speed of the rear wheels Wr, Wr, and the oil discharged from the second hydraulic pump Pr is drawn through the ports $33_3$ and $33_4$ in the spool valve 32 and the fifth one-way valve 34 into the first hydraulic pump Pf. The hydraulic pressure applied to the working hydraulic pressure chamber 16 in the hydraulic clutch C, i.e., the engaging force of the hydraulic clutch C, is automatically varied in accordance with a difference between the amount of oil discharged from the first hydraulic pump Pf and the amount of oil drawn into the second hydraulic pump Pr. At this time, when the vehicle has reached, for example, a constant speed travel condition in which a difference in rotational speed between the front and rear wheels becomes zero (0), no hydraulic pressure is applied to the working hydraulic pressure chamber 16 in the hydraulic clutch C, so that the delivery of a torque to the rear wheels Wr, Wr is cut off. It should be noted that in such constant speed travel condition, the amount of oil drawn into the second hydraulic pump Pr slightly exceeds that from the first hydraulic pump Pf, but the excess amount of oil discharged from the second hydraulic pump Pr is returned through the ports $33_3$ and $33_4$ in the spool valve 32 and the third one-way valve 22 in the fifth connecting oil passage 36 to the second hydraulic pump Pr.

Now, when a difference is produced between the amount of oil discharged from the first and hydraulic pump Pf and the amount of oil drawn into the second hydraulic pump Pr, a hydraulic pressure corresponding to a preset load of the first relief valve 26 is immediately applied to the working hydraulic pressure chamber 16 in the hydraulic clutch. After the fist relief valve 26 has been opened, a hydraulic pressure determined by the difference between the amount of oil discharged from the first hydraulic pump Pf and the amount of oil drawn into the second hydraulic pump Pr, pressure dropping characteristics of the orifice type restriction 25 and the choke type restriction 24, the viscosity of the oil or the like, is applied to the working hydraulic pressure chamber 16 in the hydraulic clutch C. The upper limit value of such hydraulic pressure is restrained by the preset load of the second relief valve 28 and hence, the upper limit value of a torque transmitted from the hydraulic clutch C can be adjusted by properly setting the preset load of the second relief valve 28.

It will be appreciated that since the amount of oil passed through the choke type restriction 24 is influenced by the viscosity of the oil, if the viscosity of the oil is increased at a low temperature, the amount of oil flowing through the choke type restriction 24 is decreased. Therefore, the amount of oil passed through the working hydraulic pressure chamber 16 in the hydraulic clutch and the orifice type restriction 25 is also decreased. At this time, the amount of pressure drop across the orifice type restriction 25 is proportional to the square of the amount of oil passed through the orifice type restriction 25. Hence, if the amount of oil passed through the orifice type restriction 25 is decreased, the amount of pressure drop in the orifice type restriction 25 is diminished, and the amount of pressure drop in the choke type restriction 24 upstream thereof is decreased by the same amount. This reduces the hydraulic pressure applied to the working hydraulic pressure chamber 16 at the low temperature, i.e., the pressure resulting from subtraction of the amount of pressure drop by the choke type restriction 24 from the pressure set at the second relief valve 28. Therefore, even if the friction coefficient is increased due to an increase in viscosity of the oil, the clutch disc-urging force provided by the hydraulic pressure is decreased by the same amount, thereby generally preventing the increase in engaging force of the hydraulic clutch at the low temperature. On the other hand, the viscosity of the oil is reduced at a high temperature, resulting in a reduced friction coefficient, but in this case, the amount of pressure drop by the choke type restriction 24 is conversely decreased, and the hydraulic pressure applied to the working hydraulic pressure chamber 16 in the hydraulic clutch is increased and hence, the clutch disc-urging force is increased by the same amount, thereby preventing the reduction in engaging force of the hydraulic clutch C.

The oil discharged from the working hydraulic pressure chamber 16 in the hydraulic clutch through the orifice type restriction 25 and the first relief valve 26, and the oil discharged from the location upstream of the working hydraulic pressure chamber 16 through the second relief valve 28 in the above manner are passed through the cooling portion 27 of the hydraulic clutch C back to the oil tank 21.

When only the front wheels Wf, Wf have trodden a road surface of a low friction coefficient during travelling of the vehicle at a constant speed, or when a quick acceleration of the vehicle has been tried, the front wheels Wf, Wf may transiently be brought into their slipping states in some cases. In such a condition, the amount of oil discharged from the first hydraulic pump Pf connected to the input shaft 8 exceeds that discharged from the second hydraulic pump Pr connected to the output shaft 9, and the third one-way valve 22 is closed to block the communication between the first and second connection oil passages 14 and 15 through the fifth connecting oil passage 36 and thus, the hydraulic clutch is brought into its engaged state in the same manner as described above, thereby permitting a driving torque to be delivered to the rear wheels Wr, Wr.

When a braking force is applied to the wheels, the front wheels Wf, Wf are locked earlier than the rear wheels Wr, Wr upon quick braking or the like, because the distribution of the braking force to the front wheels Wf, Wf is generally set higher than that to the rear wheels Wr, Wr. In addition, an engine-brake from travelling of the vehicle at a constant speed is applied to only the front wheels Wf, Wf and hence, even in this case, the rotational speed of the front wheels Wf, Wf transiently becomes lower than that of the rear wheels Wr, Wr. In such a case, the amount of oil discharged from the second hydraulic pump Pr exceeds the amount of oil drawn into the first hydraulic pump Pf, and an excessive amount of oil is discharged into the second connecting oil passage 15. Further, when the front wheels Wf, Wf have been completely locked, the first hydraulic pump Pf is stopped, and only the second hydraulic pump Pr is rotated and thus, all the amount of oil discharged from the second hydraulic pump Pr is excessive. However, this excessive amount of oil discharged is passed through the ports $33_3$ and $33_4$ in the spool valve 32 and the third one-way valve 22 in the fifth connecting oil passage 36 back to the third port 12 in the second hydraulic pump Pr. In this manner, the hydraulic pressure based on the difference between the amounts of oil discharged from the first and second hydraulic pumps Pf and Pr would not be applied to the working hydraulic pressure chamber 16 in the hydraulic clutch, even if the rotational speed of the rear wheels Wr, Wr exceeds that of the front wheels Wf, Wf. Therefore, the hydraulic clutch is retained in its disengaged state to block the transmission of the braking force to the rear wheels Wr, Wr, thereby ensuring that any change cannot be produced in distribution of the braking force to the front and rear wheels.

During the above-described forward movement of the vehicle, the second port 11 in the first hydraulic pump Pf functions as an intake port, and the fourth port 13 in the second hydraulic pump Pr functions as a discharge port. Hence, the spool 31 of the spool valve 32 is always retained in the left position as shown in FIG. 2. At this time, even if the spool 31 has been locked at the right position due to any reason, the pressure discharged from the fourth port 13 in the second hydraulic pump Pr is blocked by the fourth and sixth one-way valves 23 and 35 and applied to the port $33_3$ in the spool valve 32, causing the locked spool 31 to be urged back to the left position which is a normal position.

During backward movement of the vehicle, both the rotational directions of the first and second hydraulic pumps Pf and Pr are reversed, and the relationship between the discharge and intake ports is reversed.

More specifically, when the rotational speed of the front wheels Wf, Wf becomes larger than that of the rear wheels Wr, Wr at the start of backward movement or at the quick acceleration of backward movement, the amount of oil discharged from the first hydraulic pump Pf exceeds the amount of oil drawn into the second hydraulic pump Pr, so that a hydraulic pressure is developed in the second connecting oil passage 15. At this time, the spool 31 of the spool valve 32 is moved rightwardly by the pressure discharged from the second port 11 in the first hydraulic pump Pf, thereby permitting the second port 11 in the first hydraulic pump Pf to be put into communication with the fourth port 13 in the second hydraulic pump Pr through the ports $33_1$ and $33_2$ in the spool valve 32 and the sixth one-way valve 35. As a result, an equal hydraulic pressure is applied to both the opposite ends of the spool 31, so that the spool 31 is returned to the left position by the resilient force of the spring 30. This causes the communication between the ports $33_1$ and $33_2$ in the spool valve 32 to be cut off, allowing the spool 31 of the spool valve 32 to be moved again to the right position. By repetition of the rightward and leftward movements of the spool 31 of the spool valve 32 in this manner, a portion of the oil discharged from the first hydraulic pump Pf is drawn into the second hydraulic pump Pr.

The oil discharged into the second connecting oil passage 15 in the above manner due to the difference between the amount of oil discharged from the second port 11 in the first hydraulic pump Pf and the amount of oil drawn into the second hydraulic pump Pr through the fourth port 13 is inhibited from flowing into the fifth connecting oil passage 36 by the fourth and fifth one-way valves 23 and 34, as described above, and flows into the fourth connecting oil passage 18, where the oil is passed through the second one-way valve 20 and blocked by the first one-way valve 19. Thus, the oil is supplied into the working hydraulic pressure chamber 16 in the hydraulic clutch, so that clutch is brought into the engaged state to deliver the driving torque to the rear wheels Wr, Wr. When the rotational speed of the rear wheels Wr, Wr is increased to reach a constant speed travel condition, the rotational speeds of the first and second hydraulic pumps Pf and Pr become equal, but since the amount of oil drawn per one rotation of the second hydraulic pump Pr is larger than the amount of oil discharged per one rotation of the first hydraulic pump Pf, the oil in an amount corresponding to the difference in such discharged amounts is supplied into the first connecting oil passage 14. As a result, during backward movement of the vehicle, the torque is delivered from the side of the front wheels Wf, Wf toward the rear wheels Wr, Wr even in the constant speed travel condition.

During braking in the backward movement of the vehicle, the ground pressures of the rear wheels Wr, Wr are increased, whereas the ground pressures of the front wheels Wf, Wf are decreased due to the inertia of the vehicle body, which further increases the possibility of locking of the front wheels Wf, Wf. However, the rotational speed of the first hydraulic pump Pf is lower than that of the second hydraulic pump Pr and hence, a hydraulic pressure is developed in the first connecting oil passage 14 due to a difference between the amount of oil discharged from the third port 12 in the second hydraulic pump Pr and the amount of oil drawn into the first hydraulic pump Pf through the first port 10, and the third one-way valve 22 is closed. Therefore, the hydraulic clutch C is brought into the engaged state through the first one-way valve 19 in the third connecting oil passage 17. Thus, in such a case, the rotational forces of the rear wheels Wr, Wr are transmitted to the front wheels Wf, Wf to restrain the complete locking of the front wheels Wf, Wf.

During the above-described backward movement of the vehicle, the second port 11 in the first hydraulic pump Pf functions as a discharge port, and the fourth port 13 in the second hydraulic pump Pr functions as an intake port and thus, the spool 31 of the spool valve 32 is moved to the right position. However, even if the spool should be locked at the left position, the pressure discharged from the second port 11 in the first hydraulic pump Pf is applied to the port 33₁ in the spool valve 32 so that the locked spool 31 can be urged back to the right position.

Although the embodiment pf the present invention has been described in detail, it will be understood that the present invention is not limited to the above-described embodiment, and various minor modifications in design can be made without departing from the scope of the invention defined in the claims.

For example, in the embodiment, the communication between the second connecting oil passage 15 and the fifth connecting oil passage 36 is cut off by the fourth and fifth one-way valves 23 and 34 as well as the spool valve 32, when the oil is discharged from the second port 11 in the first hydraulic pump Pf during the backward movement of the vehicle. Alternatively, the second connecting oil passage 15 and the fifth connecting oil passage 36 may put be out of communication with each other, and only when the oil is discharged from the fourth port 13 in the second hydraulic pump Pr during the forward movement of the vehicle, the second connecting oil passage 15 and the fifth connecting oil passage 36 may be put into communication with each other. In short, if the communication between the second connecting oil passage 15 and the fifth connecting oil passage 36 is cut off during the backward movement of the vehicle, the hydraulic pressure can be developed in the second connecting oil passage 15 when the front wheels have slipped during the backward movement, thereby causing the hydraulic clutch to be brought into engaged state, so that the torque can be delivered to the rear wheels Wr, Wr.

What is claimed is:

1. A power transmitting system of a four-wheel drive vehicle having primary driven wheels driven directly by a prime mover, and subsidiary driven wheels driven through a hydraulic clutch, comprising a first hydraulic pump driven in operative association with said primary driven wheels and having a first port which functions as a discharge port during forward movement of the vehicle and as an intake port during backward movement of the vehicle, and a second port which functions as an intake port during forward movement of the vehicle and as a discharge port during backward movement of the vehicle;

a second hydraulic pump driven in operative association with said subsidiary driven wheels and having a third port which functions as an intake port during forward movement of the vehicle and as a discharge port during backward movement of the vehicle, and a fourth port which functions as a discharge port during forward movement of the vehicle and as an intake port during backward movement of the vehicle;

a first connecting oil passage connecting said first port with said third port;

a second connecting oil passage connecting said second port with said fourth port;

a third connecting oil passage connecting said first connecting oil passage with a working hydraulic pressure chamber in said hydraulic clutch;

a fourth connecting oil passage connecting said second connecting oil passage with said working hydraulic pressure chamber in the hydraulic clutch;

a first one-way valve provided in said third connecting oil passage for permitting only a flow of oil from a side of the first connecting oil passage toward said working hydraulic pressure chamber; and a second one-way valve provided in said fourth connecting oil passage for permitting only a flow of oil from a side of the second connecting oil passage toward said working hydraulic pressure chamber.

2. The power transmitting system of claim 1, wherein a fifth connecting oil passage is diverged from said first connecting oil passage and connected to said second connecting oil passage;

a third one-way valve is provided in said fifth connecting oil passage for permitting only a flow of oil from the second connecting oil passage side toward said first connecting oil passage; and means are provided for cutting off the communication between said second connecting oil passage and said fifth connecting oil passage during backward movement of the vehicle.

3. The power transmitting system of claim 1, wherein means are provided for restricting the flow of oil into said hydraulic pressure chamber.

4. The power transmitting system of claim 1, wherein means are provided for restricting the flow of oil from said hydraulic pressure chamber.

5. The power transmitting system of claim 4, wherein means are provided for regulating the oil pressure to a predetermined level downstream of said flow restricting means.

6. The power transmitting system of claim 2, wherein said means for cutting off communication includes a spool valve operable to a closed condition in response to oil pressure from said second port.

7. The power transmitting system of claim 6, wherein said spool valve also opens a by-pass from said second port to said fourth port in said closed condition.

8. The power transmitting system of claim 1, wherein said first hydraulic pump discharges a lesser amount of oil than said second hydraulic pump when the primary wheels and subsidiary wheels are rotating at the same speed.

9. A power transmitting system of a four-wheel drive vehicle having front wheels driven directly by a prime mover, and rear wheels driven through a hydraulic clutch, comprising
- a first hydraulic pump driven in operative association with said front wheels and having a first port which functions as a discharge port during forward movement of the vehicle and as an intake port during backward movement of the vehicle, and a second port which functions as an intake port during forward movement of the vehicle and as a discharge port during backward movement of the vehicle;
- a second hydraulic pump driven in operative association with said rear wheels and having a third port which functions as an intake port during forward movement of the vehicle and as a discharge port during backward movement of the vehicle, and a fourth port which functions as a discharge port during forward movement of the vehicle and as an intake port during backward movement of the vehicle;
- a first connecting oil passage connecting said first port with said third port;
- a second connecting oil passage connecting said second port with said fourth port;
- a third connecting oil passage connecting said first connecting oil passage with a working hydraulic pressure chamber in said hydraulic clutch;
- a fourth connecting oil passage connecting said second connecting oil passage with said working hydraulic pressure chamber in the hydraulic clutch;
- a first one-way valve provided in said third connecting oil passage for permitting only a flow of oil from a side of the first connecting oil passage toward said working hydraulic pressure chamber;
- a second one-way valve provided in said fourth connecting oil passage for permitting only a flow of oil from a side of the second connecting oil passage toward said working hydraulic pressure chamber;
- a fifth connecting oil passage diverged from said first connecting oil passage and connected to said second connecting oil passage;
- a third one-way valve provided in said fifth connecting oil passage for permitting only a flow of oil from the second connecting oil passage side toward said first connecting oil passage; and
- means for cutting off the communication between said second connecting oil passage and said fifth connecting oil passage during backward movement of the vehicle.

10. A power transmitting system of a four-wheel drive vehicle having primary driven wheels driven directly by a prime mover, and subsidiary driven wheels driven through a hydraulic clutch, comprising
- a first hydraulic pump driven in response to rotation of said primary driven wheels;
- a second hydraulic pump driven in response to rotation of said subsidiary driven wheels;
- said first and second hydraulic pumps each having a pair of ports with one of said ports functioning as an intake port during forward movement of the vehicle and as a discharge port during backward movement of the vehicle and the other of said ports functioning as a discharge port during forward movement of the vehicle and as an intake port during backward movement of the vehicle;
- a first oil passage connecting the intake port of one said hydraulic pump with the discharge port of the other said hydraulic pump;
- a second oil passage connecting the discharge port of said one hydraulic pump with the intake port of said other hydraulic pump; and
- means connecting said first and second oil passages with a working hydraulic pressure chamber in said hydraulic clutch including means for permitting oil flow only in a direction toward said hydraulic pressure chamber.

11. The power transmitting system of claim 10, wherein means are provided for restricting the flow of oil into said hydraulic pressure chamber.

12. The power transmitting system of claim 10, wherein means are provided for restricting the flow of oil from said hydraulic pressure chamber.

13. The power transmitting system of claim 12, wherein means are provided for regulating the oil pressure to a predetermined level downstream of said flow restricting means.

14. The power transmitting system of claim 10, wherein means are provided for connecting said first and second oil passages including means for permitting oil flow only in a direction from said second oil passage to said first oil passage, and means for preventing said oil flow from said second oil passage to said first oil passage during backward movement of the vehicle.

15. The power transmitting system of claim 14, wherein said means for preventing oil flow includes a spool valve operated to a closed position by oil pressure from the discharge port of said first hydraulic pump during backward movement of the vehicle.

16. The power transmitting system of claim 15, wherein said spool valve also opens a one-way by-pass from the discharge port of said first hydraulic pump to the intake port of said second hydraulic pump in said closed position during backward movement of the vehicle.

17. The power transmitting system of claim 10 wherein said first hydraulic pump discharges less oil than said second hydraulic pump when the primary and subsidiary wheels are traveling at the same speed.

* * * * *